(12) United States Patent
Karschnia et al.

(10) Patent No.: US 8,050,624 B2
(45) Date of Patent: Nov. 1, 2011

(54) DISTRIBUTED PROCESS CONTROL SYSTEM AND METHOD UTILIZING WIRELESS COMMUNICATION OF PACKET MESSAGES

(75) Inventors: Robert J. Karschnia, Chaska, MN (US); Marcos A. V. Peluso, Chanhassen, MN (US); Eric D. Rotvold, Inver Grove Heights, MN (US); Gabriel L. Sierra, Minneapolis, MN (US)

(73) Assignee: Rosemount, Inc., Eden Prairie, MN (US)

( * ) Notice: Subject to any disclaimer, the term of this patent is extended or adjusted under 35 U.S.C. 154(b) by 453 days.

(21) Appl. No.: 11/167,066

(22) Filed: Jun. 24, 2005

(65) Prior Publication Data

US 2006/0291438 A1 Dec. 28, 2006

(51) Int. Cl.
*H04B 7/00* (2006.01)
(52) U.S. Cl. ...... 455/41.2; 455/66.1; 455/134; 455/572; 455/420; 370/338; 370/339
(58) Field of Classification Search .......... 370/310–350; 455/66.1, 134, 572, 420, 41.2, 424, 422.1, 455/414.1, 90.3
See application file for complete search history.

(56) References Cited

U.S. PATENT DOCUMENTS

| | | | |
|---|---|---|---|
| 6,092,174 A | 7/2000 | Roussakov et al. | |
| 6,192,026 B1* | 2/2001 | Pollack et al. | 370/203 |
| 6,603,744 B2 | 8/2003 | Mizutani et al. | |
| 6,725,302 B1* | 4/2004 | Benayoun et al. | 710/62 |
| 6,912,651 B1* | 6/2005 | Hamdi et al. | 713/1 |
| 7,164,117 B2* | 1/2007 | Breed et al. | 250/221 |
| 7,245,271 B2* | 7/2007 | Nixon et al. | 345/2.1 |
| 2003/0043052 A1* | 3/2003 | Tapperson et al. | 340/825.37 |
| 2004/0057411 A1 | 3/2004 | Straub et al. | |
| 2005/0015534 A1 | 1/2005 | Wu | |
| 2005/0033826 A1 | 2/2005 | Jones et al. | |
| 2005/0130605 A1* | 6/2005 | Karschnia et al. | 455/90.3 |

* cited by examiner

*Primary Examiner* — Dwayne Bost
*Assistant Examiner* — Amancio Gonzalez
(74) *Attorney, Agent, or Firm* — Kinney & Lange, P.A.

(57) ABSTRACT

A distributed control and/or monitoring system and method includes a local application and a remote application separated from the local application. The local application includes a host computer. The remote application includes a plurality of field devices and a communication bus connected to the plurality of field devices. Packet messages are wirelessly communicated between the local application and the remote application such that the host computer and field devices can communicate with each other as if they were directly connected to the same communication bus.

12 Claims, 6 Drawing Sheets

DISTRIBUTED PROCESS CONTROL SYSTEM AND METHOD UTILIZING WIRELESS COMMUNICATION OF PACKET MESSAGES

BACKGROUND OF THE INVENTION

In many industrial settings, control systems are used to monitor and control inventories, processes, and the like. Often, such control systems have a centralized control room, with computer systems having user inputs and outputs and having peripheral systems that are known in the art, such as printers, scanners, and the like. The controller and process subsystems are coupled to the computer systems.

Often control systems are distributed such that field devices are separated or geographically removed from the control room. The process subsystem is connected to the field devices. As used herein, the term "field device" encompasses any device that performs a function in a distributed control system and is known in the control art.

Generally, each field device includes a transducer. A transducer is understood to mean either a device that generates an output signal based on a physical input or that generates a physical output based on an input signal. The transducer transforms an input into an output having a different form. Types of transducers include various analytical equipment, pressure sensors, thermistors, thermocouples, strain gauges, flow transmitters, positioners, actuators, solenoids, indicator lights, and the like.

Traditionally, analog field devices have been connected to the process subsystem and the control room by two-wire twisted-pair current loops, with each device connected to the control room by a single two-wire twisted pair loop. Typically, a voltage differential is maintained between the two wires of approximately 20 to 25 volts, and a current between 4 and 20 milliamps (mA) runs through the loop. An analog field device transmits a signal to the control room by modulating the current running through the current loop to a current proportional to the sensed process variable. An analog field device that performs an action under the control of the control room is controlled by the magnitude of the current through the loop, which is modulated by the ports of the process subsystem under the control of the controller.

Traditional discrete devices transmit or respond to a binary signal. Typically, discrete devices operate with a 24-volt signal (AC or DC), a 110 or 240 volt AC signal, or a 5 volt DC signal. Of course, a discrete device may be designed to operate according to any electrical specification required by the control environment.

While historically field devices were capable of performing only one function, more recently hybrid systems that superimpose digital data on the current loop have been used in distributed control systems. The Highway Addressable Remote Transducer (HART) and the Instrument Society of America (ISA) Fieldbus SP50 standards superimpose a digital carrier signal on the current loop signal. The digital carrier signal can be used to send secondary and diagnostic information. Examples of information provided over the carrier signal include secondary process variables, diagnostic information (such as sensor diagnostics, device diagnostics, wiring diagnostics, process diagnostics, and the like), operating temperatures, sensor temperature, calibration data, device ID numbers, configuration information, and so on. Accordingly, a single field device may have a variety of input and output variables and may implement a variety of functions.

Typically, remote applications have been added to a control system by running very long homerun cables from the control room to the remote application. If the remote application is, for example, a half of a mile away, the costs involved in running such a long cable can be very expensive. If multiple homerun cables have to be run to the remote application, the costs become even more prohibitive. Therefore, wireless communication is desirable. However, to minimize costs, it is also desirable to maintain existing control systems and communication protocols, to reduce the costs associated with changing existing systems to accommodate the wireless communication.

BRIEF SUMMARY OF THE INVENTION

A distributed control and/or monitoring system and method includes a local application and a remote application separated from the local application. The local application includes a host computer. The remote application includes a plurality of field devices and a communication bus connected to the plurality of field devices. Packet messages are wirelessly communicated between the local application and the remote application such that the host computer and field devices can communicate with each other as if they were directly connected to the same communication bus.

The method of wirelessly communicating packet messages through the distributed control and/or monitoring system includes generating an electrical packet message with a host computer. Then the electrical packet message from the host computer is transformed by a first interface into an electromagnetic packet message that is wirelessly transmitted. The second interface then receives the electromagnetic packet message from the first interface, which transforms the electromagnetic packet message into a second electrical packet message. The electrical packet message is then communicated to a communication bus with the second interface, where it is received by a field device. Similarly, the method can be reversed to communicate from a field device to the host computer or to another field device.

DETAILED DESCRIPTION

Figure 1:
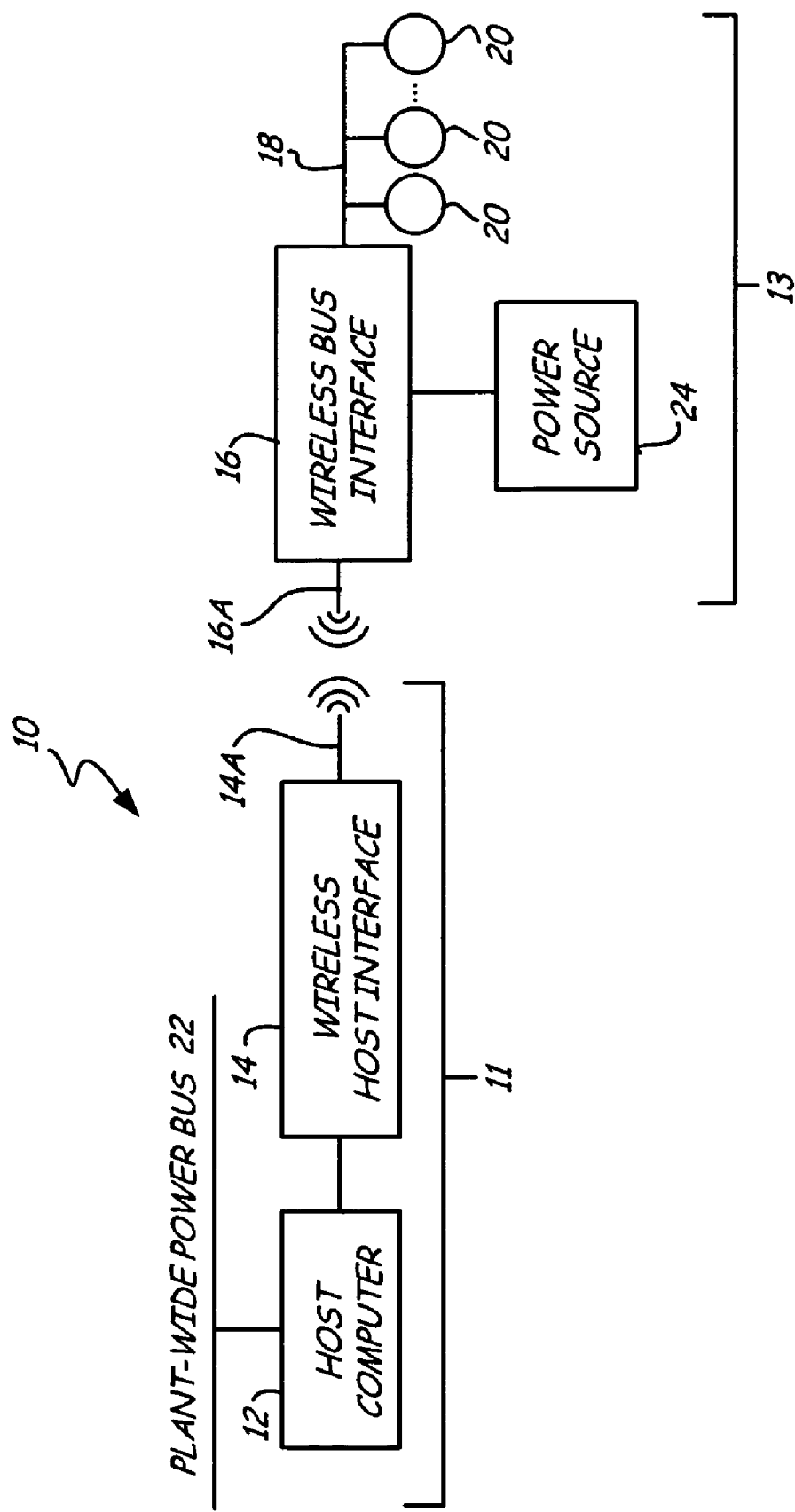
FIG. 1 is an embodiment of the distributed process control system of the present invention.

The present invention utilizes wireless technology to free the process control network from its traditional wired topologies. There is a need in the art for a distributed process control system that utilizes wireless transmitters to reduce or eliminate the need for costly homerun cabling, while maintaining the packetized communication protocols to reduce the need for costly customization of existing systems. Wireless transceivers can be used to fulfill this need, both to adapt existing process control networks to provide wireless communications capabilities and to construct new process control networks without costly homerun cabling, without expensive power filters, without expensive customization, and utilizing standard packetized communication protocols.

In order to seamlessly adapt to existing process control networks, the system utilizes the existing packetized communication protocols, such as Fieldbus, Modbus, Hart, Profibus, or other protocols. Communication packets are transformed from electrical signals originating from a host computer, or field device, to electromagnetic signals capable of wireless transmission. They are then transformed back into electrical signals that are communicated to the desired field device or host computer. In this way the communication packets remain in their packetized form, but the physical layer of the communication packets changes between electrical and electromagnetic forms.

One example of an implementation of the present invention is in connection with an industrial processing plant including a remote waste water treatment facility. In industrial processing plants, it is not uncommon for a waste water treatment facility to be physically located a half mile or more away from the rest of the plant. In order to control this facility from the control room, the prior art required that a communications line be run the entire distance to the water treatment facility. The present invention eliminates the need for the homerun cabling, by providing wireless communication capabilities from the control room to the remote application. Furthermore, the present invention retains the packetized communication protocol, thereby enabling the remote application to be seamlessly integrated with the rest of the control system as if it were locally connected.

It was previously believed that the remote application would not have power easily available. However, it has been found that often times power is available, and therefore standard distributed control system implementation is available. However, these implementations are not capable of being controlled from the existing control system without great cost and complex customization. The present invention solves this problem by enabling the control system to be extended using wireless communication to monitor and control the remote location. The present invention enables the host computer and field devices to operate as if they were connected to the same wired communication bus, even though the system is actually utilizing wireless communication.

FIG. 1 is an embodiment of distributed process control system 10 of the present invention. System 10 includes local application 11 and remote application 13. Local application 11 includes host computer 12 and wireless host interface 14. Remote application 13 includes wireless bus interface 16, communication bus 18, and field devices 20. Local application 11 is powered by plant-wide power bus 22. Remote application 13 is powered by power source 24.

Host computer 12 of local application 11 monitors and/or controls distributed process control system 10. Host computer 12 may be confined within a control room, may span more than one office, or may be geographically separated and connected via a network (such as telephone networks, the Internet, or any other type of network). Additionally, host computer 12 may include both automated and user-initiated control systems.

Figure 2:
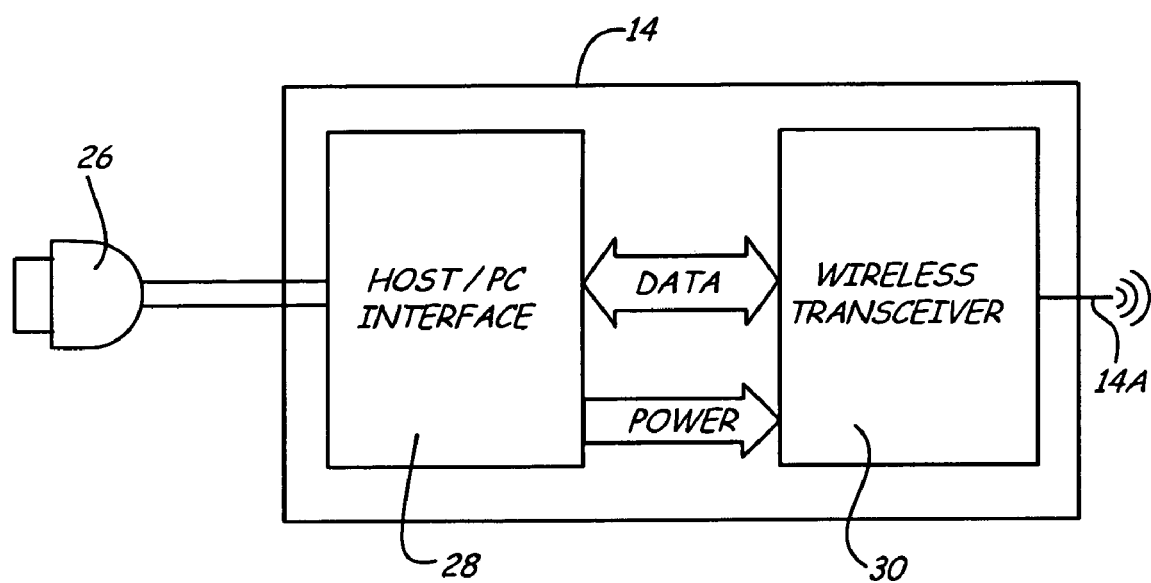
FIG. 2 is a block diagram of an embodiment of a host interface.

Wireless host interface 14, described in more detail with reference to FIG. 2, is connected to host computer 12 to provide an interface between host computer 12 and wireless bus interface 16. The wireless communication capability of interface 14 allows remote applications to be controlled by and communicate with host computer 12 without the need for long homerun cabling.

Interface 16 of remote application 13 provides wireless communication capability between interface 14 and communication bus 18. Interface 16 also performs the Link Active Scheduler (LAS) communication functions for communication bus 18, by maintaining a central schedule for all communication between devices on communication bus 18. Interface 16 is described in more detail with reference to FIG. 3.

Communication bus 18 is a wired communication path between field devices 20 and interface 16. In this embodiment, communication bus 18 operates according to the Foundation Fieldbus packetized communication protocol, described in more detail with reference to FIG. 4. Although the embodiment of the present invention is described with reference to the Foundation Fieldbus communication protocol, it is recognized that any packetized communication protocol could be used, such as Modbus, Hart, Profibus, other Fieldbus protocols, or other communication protocols.

Most of field devices 20 contain two main components: a bus communication circuit and an actuator/transducer ("transducer"). The communication circuit enables field devices 20 to communicate over communication bus 18 according to the appropriate communication protocol. An example of a communication circuit is disclosed in U.S. patent application Ser. No. 10/936,421 filed on Sep. 8, 2004 and entitled LOW LATENCY DATA PACKET RECEPTION AND PROCESSING by Brian A. Franchuk et al. The transducer refers to any device that translates an input into an output having a different form from the input (e.g. a device that generates a physical output based on an electrical input signal or an electrical output based on a physical input signal). Thus, field devices 20 may be either input devices, output devices, or both. Field devices 20 may contain both input and output components in communication with the communication electronics. For example, field device 20 may contain both a sensor and indicator lights or an LCD display, for sensing information and transmitting raw or groomed data to the communication electronics, and for receiving a display signal or display code from host computer 12 and displaying a value on the display.

Field devices 20 may also include transmitters that are not capable of being connected directly to communication bus 18. These field devices will be connected to the communication bus with an adapter, capable of interfacing between the field device and the communication bus. The adapter can connect to a single field device or a plurality of field devices. In this way, existing field devices may be controlled and/or monitored by distributed process control system 10, even if they were not originally designed to communicate over communication bus 18.

In this embodiment, local application 11 is powered by plant-wide power bus 22, and remote application 13 is powered by power source 24. Plant-wide power bus 22 is a standard wall outlet power delivery system providing conventional 120 volt AC power. Power source 24 may include batteries, existing homerun cabling, a single charged wire, solar power circuitry, and various other power sources. In addition, plant-wide power bus 22 could also be used to power remote application 13, if available.

Since no information is transmitted along the power wiring, the power supply does not need to be tightly regulated. As a result, relatively unregulated power supplies that are simple and inexpensive can be used to deliver power, and simple filtering techniques can be used. By powering remote application 13 from a power supply that is separate from the communications path, the process control network architecture becomes more versatile with reduced cost, allowing for network topologies that were not previously possible without significant investment in cabling and hardware components.

Distributed process control system 10 enables remote application 13 to be installed some distance away from local application 11 without the need for expensive homerun cabling. Furthermore, system 10 enables host computer 12 to communicate with remote application 13 as if it were connected locally, such that no or few changes need to be made to an existing host computer 12. In addition, remote application 13 can be built to be intrinsically safe, such that it can be safely installed around flammable or explosive materials.

Distributed process control system 10 enables host computer 12 of local application 11 to communicate with field devices 20 of remote application 13 as if field devices 20 were connected directly to local application 11. Similarly, distributed process control system 10 enables field devices 20 of remote application 13 to communicate with host computer 12 of local application 11 as if host computer 11 were directly connected to communication bus 18.

When host computer 12 wants to communicate with field devices 20, it generates a electrical packetized message according to the appropriate communication protocol. The message is communicated to interface 14 via one or more electrical wires. Interface 14 receives the packetized message and transforms it into an electromagnetic packetized message that is transmitted from antenna 14A. The electromagnetic packetized message is then received by antenna, 16A of interface 16. Interface 16 transforms the electromagnetic packetized message back into an electrical packetized message and communicates it onto communications bus 18. Field devices 20 monitor communications bus 18 and receive the packetized message.

In order for a packet message to be addressed to host computer 12 or a particular field device 20, a packet message can include an address. Host computer 12 and each of field devices 20 have a unique address (V(TN)). When a packet message is communicated, host computer 12 and field devices 20 compare the address in the message to their unique address to determine whether or not the message is intended for them.

Thus, communication is not limited to being sent from host computer 12 and received by field devices 20. Rather, distributed process control system 10 enables communication from field devices 20 to host computer 12, and also between field devices 20 themselves. To communicate, a field device 20 generates an electrical message that is communicated onto communication bus 18. Other field devices 20 compare the address in the message with their unique address to determine whether or not the message is intended for them. The message is also received by interface 16 and wirelessly transmitted to interface 14. Interface 14 transforms the message back into an electrical packetized message that is communicated to host computer 12, which compares the address in the message to see whether the message is intended for it. Thus, the distributed process control system also enables field devices 20 to communicate with host computer 12 as if host computer 12 were directly connected to communication bus 18.

Wireless communication between interface 14 and interface 16 maintains the packetized message format. Although interfaces 14 and 16 transform the physical layer of communication packets between electrical and electromagnetic forms, the message packet remains in its packetized form. For example, a Fieldbus packetized message received from host computer 12 is transformed by interface 14 from an electrical form into an electromagnetic form. Even so, the electromagnetic form still retains the message in its packetized form. In this way, after the message is received by interface 16 and transformed back into the electrical form, the message is the same as the original Fieldbus packetized message generated by host computer 12.

FIG. 2 is a block diagram of one embodiment of wireless host interface 14. Interface 14 includes universal serial bus (USB) plug 26, host/PC interface 28, wireless transceiver 30, and antenna 14A.

USB plug 26 connects with a USB port of host computer 12 to connect interface 14 with host computer 12. In this embodiment, communication between host computer 12 and host/PC interface 28 conforms to the USB protocol. Host/PC interface 28 includes USB electronics to communicate over the USB protocol. It is recognized that communications between interface 14 and host computer 12 need not be limited to USB as described in the exemplary embodiment. Other possible interfaces include PCMCIA, compact flash, RS232, secure digital (SD), multi-media card (MMC), and other popular PC/host computer interfaces.

Interface 14 also includes wireless transceiver 30 capable of converting between electrical packetized messages and electromagnetic packetized messages. Wireless transceiver 30 is capable of bi-directional wireless communications. Wireless transceiver 30 may include wireless networking technologies (such as IEEE 802.11b wireless access points and wireless networking devices built by Linksys of Irvine, Calif.), cellular or digital networking technologies (such as Microburst® by Aeris Communications, Inc. of San Jose, Calif.), ultra-wide band, free space optics Global System for Mobile Communications (GSM), General Packet Radio Service (GPRS), Code Division Multiple Access (CDMA), spread spectrum technology, infrared communication techniques, SMS (Short Messaging Service/text messaging) 802.15.4 (Zigbee), or any other wireless technology. More generally, the present invention can make use of any wireless protocol capable of supporting data transmissions, including transmissions over any circuit switched network or any packetized routing network.

In this embodiment, interface 14 is powered by host computer 12. Power from host computer 12 is received through USB plug 26 which powers host/PC interface 28. Host/PC interface in turn powers wireless transceiver 30. In another embodiment, interface 14 includes a separate power source, enabling more power to be delivered to interface 14 than can be delivered through the USB interface.

Figure 3:
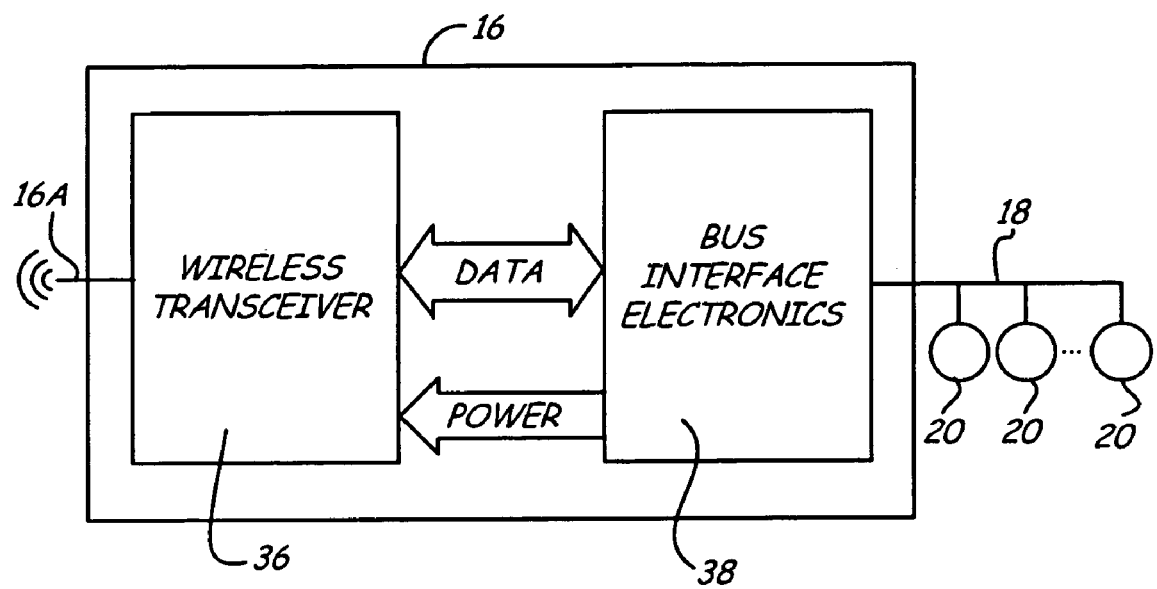
FIG. 3 is a block diagram of an embodiment of a wireless bus interface.

FIG. 3 is a block diagram of an embodiment including wireless bus interface 16, communication bus 18, and field devices 20. Interface 16 includes antenna 16A, wireless transceiver 36, and bus interface electronics 38.

Wireless transceiver 36 is capable of converting between electrical packetized messages and electromagnetic packetized messages to provide bi-directional wireless communication capabilities with interface 14. Wireless transceiver 36 may include wireless networking technologies (such as IEEE 802.11b wireless access points and wireless networking devices built by Linksys of Irvine, Calif.), cellular or digital networking technologies (such as Microburst® by Aeris Communications, Inc. of San Hose, Calif.), ultra-wide band, free space optics Global System for Mobile Communications (GSM), General Packet Radio Service (GPRS), Code Division Multiple Access (CDMA), spread spectrum technology, infrared communication techniques, SMS (Short Messaging Service/text messaging), 802.15.4 (Zigbee), or any other wireless technology. More generally, the present invention can make use of any wireless protocol capable of supporting data transmissions, including transmissions over any circuit switched network or any packetized routing network. Wireless transceiver 36 is capable of communicating with wireless transceiver 30 of interface 14.

Bus interface electronics 38 includes electronic circuitry capable of communicating between wireless transceiver 36 and communication bus 18. Bus interface electronics 38 acts as the Link Active Scheduler (LAS) to control communication across communication bus 18 according to the appropriate communication protocol. Communication bus 18, including one or more electrical wires, may operate with any type of bus communication protocol such as Foundation Fieldbus, Modbus, Hart, Profibus, other Fieldbus protocols, or any other communication protocol. An example of electronic circuitry for a Fieldbus communication bus is provided in U.S. patent application Ser. No. 10/936,421 filed on Sep. 8, 2004 and entitled LOW LATENCY DATA PACKET RECEPTION AND PROCESSING by Brian A. Franchuk et al. Field devices 20 are connected to communication bus 18 which enables them to send and receive communications with bus interface electronics 38 or other field devices 20.

Interface 16 enables distributed process control system 10 to include remote application 13 located a distance from local application 11 without the need for costly homerun cabling, and without expensive customized implementations. Rather, interface 16 can be added to an existing local application 11 to expand the reach of host computer 12 to the remote application. Although remote application 13 is located some distance from local application 11, and although communication is transmitted wirelessly, host computer 12 interacts with remote application 13 as if it were a part of local application 11. Thus, few if any changes need to be made to the operation of host computer 12. Furthermore, since communication is performed wirelessly, as opposed to through the power wiring, a separate power source may be used to power remote application 13. Separating communication and power delivery further reduces costs because inexpensive power sources may be used, which utilize simple filtering techniques.

Figure 4:
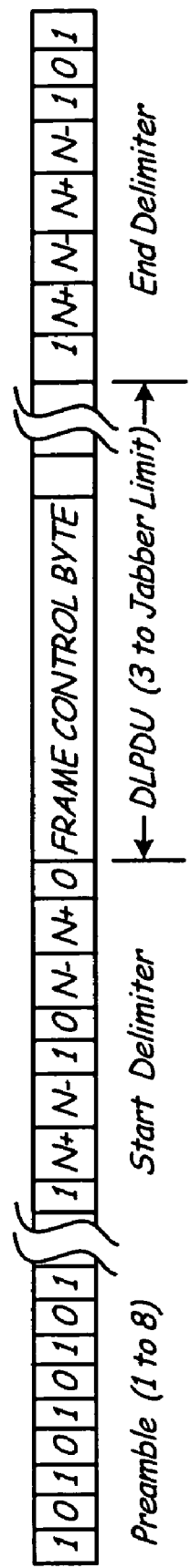
FIG. 4 illustrates an embodiment of a communication packet communicated through the distributed process control system.

FIG. 4 illustrates an embodiment of a communication packet communicated through distributed process control system 10. For exemplary purposes, the communication packet shown is a Foundation Fieldbus communication packet. However, as previously described, the present invention may utilize any packet-based communication protocol. FIG. 4 specifically shows the format of a Physical Layer Protocol Data Unit (PhPDU). The PhPDU includes a preamble, a Start Delimiter (SD) a Data Link Protocol Data Unit (DLPDU) and an End Delimiter (ED). The preamble is the first several bits of the PhPDU message. The Fieldbus specification allows for one to eight bytes of preamble. The device receiving the message uses the preamble to synchronize with the incoming message. As shown, the sequence of the first byte of the preamble is 1 0 1 0 1 0 1 0.

The Start Delimiter (SD) immediately follows the preamble. There is one SD per message. The Fieldbus specification requires that the SD have non-character data (N+ and N−), which always appear in the SD message in complementary pairs. This encoding scheme makes the SD unique and impossible to confuse with the data portion (DLPDU) of the message. The sequence shown in FIG. 4 for the SD is 1 N+ N− 1 0 N− N+ 0.

The DLPDU is a variable length message that includes the data content of the packet message. It contains a Frame Control (FC) byte as its first byte and a Frame Check Sequence (FCS) check sum as its final two bytes. The length of DLPDU is variable, with a minimum of three bytes (in the case of an RT message) up to a jabber limit of, for example, about 300 bytes. If the DLPDU is being transmitted to a particular address, the address is included as the second bit of the DLPDU.

The End Delimiter (ED) follows the DLPDU. It represents the last byte of any PhPDU message. Similar to the SD, the ED includes non-character data in complementary pairs. This encoding scheme makes the ED unique and impossible to confuse with the DLPDU. The sequence shown for the End Delimiter is 1 N+ N− N+ N− 1 0 1.

Figure 5:
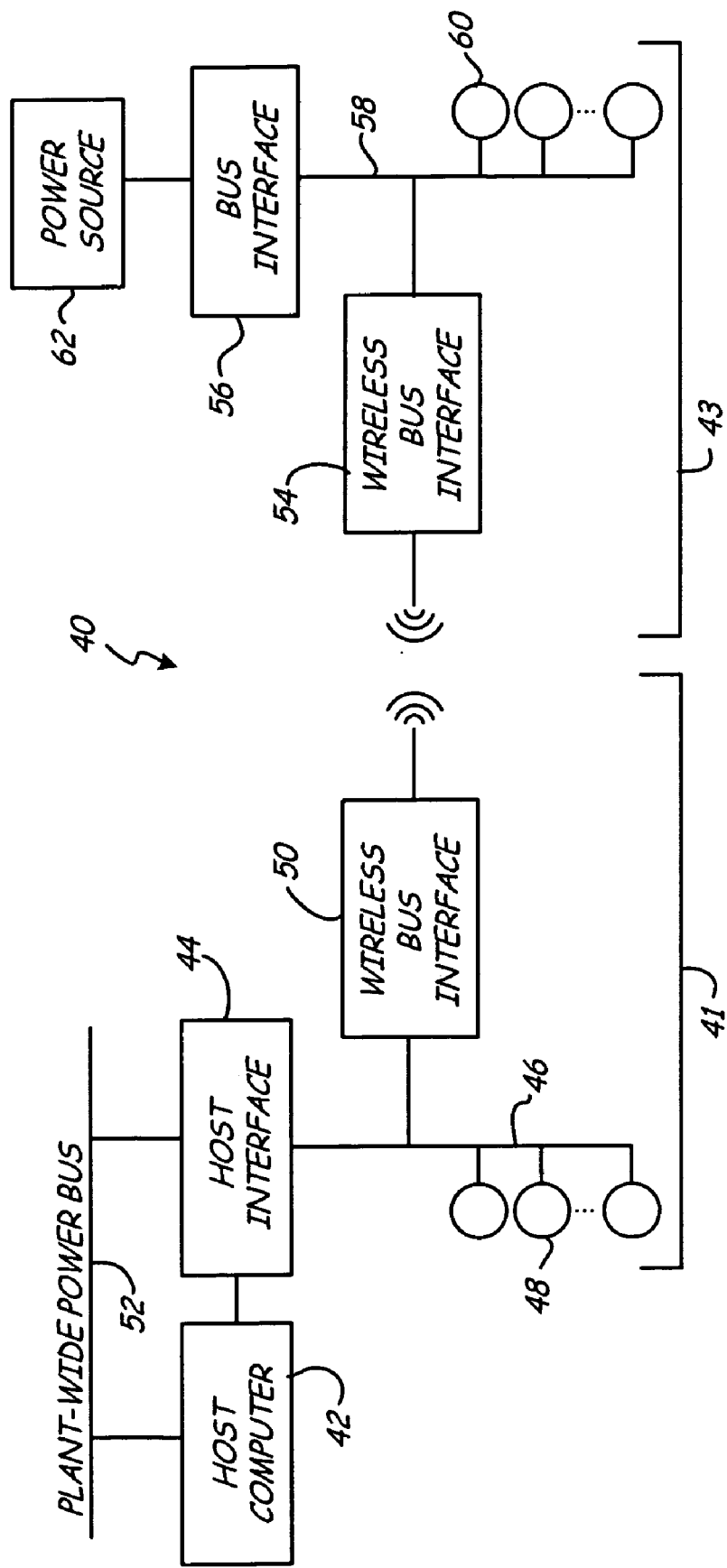
FIG. 5 is a block diagram of another embodiment of the distributed process control system of the present invention.

FIG. 5 is a block diagram of another embodiment of distributed process control system 40 of the present invention. In this embodiment, system 40 enables two separate communication buses to be operated as if they were a single bus, using wireless communication. System 40 includes local application 41 and remote application 43. Local application 41 includes host computer 42, host interface 44, communication bus 46, field devices 48, and wireless bus interface 50 all powered by plant-wide power bus 52. Remote application 43 includes wireless bus interface 54, bus interface 56, communication bus 58, and field devices 60 all powered by power source 62.

Host computer 42 monitors and/or controls distributed process control system 40. Host interface 44 interfaces host computer 42 with communication bus 46. Bus interface 44 performs the LAS communication functions for communication bus 46 and communication bus 58 by maintaining a central schedule for all communication between all of the devices. Communication bus 46 is a wired communication path between field devices 48 and host interface 44. Communication over communication bus 46 is, for example, performed according to the Foundation Fieldbus packetized communication protocol.

Wireless bus interface 50 enables local application 41 to be extended to communicate with remote application 43. Wireless bus interface 50 includes bus electronics that enable it to communicate with communication bus 48 and a wireless transceiver that enables it to communicate wirelessly.

Remote application 50 includes a second communication bus—communication bus 58. Bus interface 56 performs the Link Master (LM) functions for communication bus 58, such that it is configured to take over the responsibilities of host interface 44 (the LAS) should host interface 44 fail or become inoperable, or should the wireless connection be lost. Communication bus 58 provides a communication path between field devices 60.

Wireless bus interface 54 enables remote application 43 to communicate with local application 41. Wireless bus interface 54 includes bus electronics that enable it to communicate with communication bus 58 and a wireless transceiver that enables it to communicate wirelessly with wireless bus interface 50.

Wireless bus interfaces 50 and 54 simulate a wired connection between communication bus 46 and communication bus 58, such that all other devices think that they are connected to a single wired communication bus. In doing so, all packetized messages that are communicated are communicated over both communication bus 46 and communication bus 58. Thus, host computer 42 merely needs to be informed of the address of remote field devices 60 in order to communicate with them. Similarly, field devices 60 are capable of communicating with host computer 42 or field devices 48 simply by including the appropriate address in the communication packet.

Wireless bus interfaces 50 and 54 simulate a wired connection by receiving an electrical packetized message from the respective communication bus 46 or 58, and transforming the message into an electromagnetic packetized message. The message is then received by the distant wireless bus interface 50 or 54, which transforms the electromagnetic packetized message back into an electrical packetized message that is communicated along the respective communication bus 46 or 58.

Figure 6:
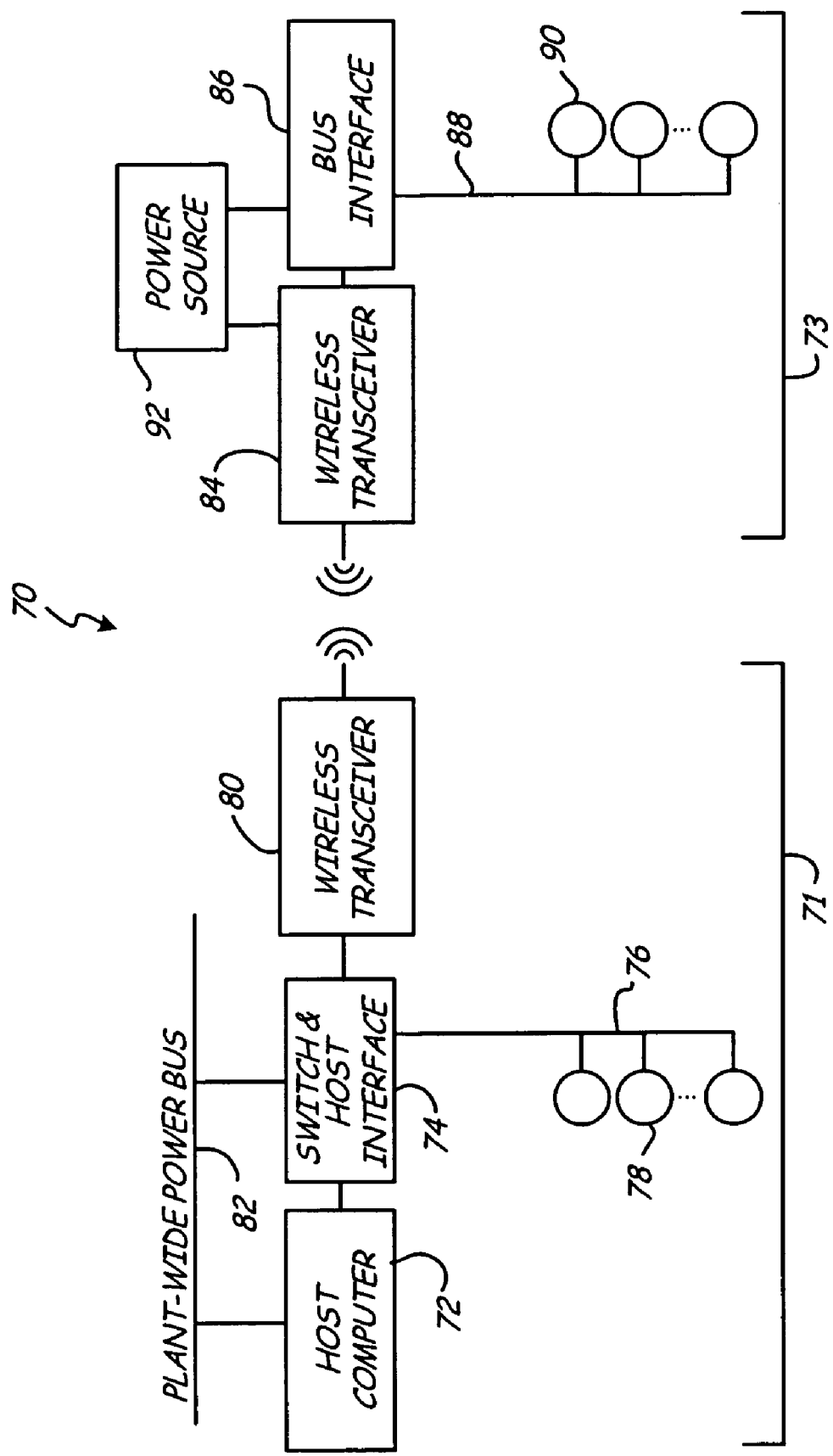
FIG. 6 is a block diagram of another embodiment of the distributed process control system of the present invention.

FIG. 6 is a block diagram of another embodiment of distributed process control system 70 of the present invention. This embodiment of the invention includes two wired communication buses. The two communication buses operate independent of each other, in that a message that appears on one of the communication buses does not appear on the other communication bus unless it is needed by a device on that bus. However, from the perspective of host computer 72 and field devices 78 and 90, it appears that there is only one single wired communication bus. Communication to any computer or device in system 70 is as simple as generating a message addressed to the particular computer or device, just as if all computers and devices were connected to the same wired communication bus.

System 70 includes local application 71 and remote application 73. Local application 71 includes host computer 72, switch and host interface 74, communication bus 76, field devices 78, and wireless transceiver 80 all powered by plant-wide power bus 82. Remote application 73 includes wireless transceiver 84, bus interface 86, communication bus 88, and field devices 90. Remote application 73 is powered by power source 92.

As in previous embodiments, host computer 72 controls and/or monitors all devices in local application 71 and remote application 73. However, in this embodiment messages are routed by switch and host interface 74 to the appropriate communication bus or host computer. To do so, switch and host interface 74 receives a message from host computer 72, communication bus 76, or wireless transceiver 80. The intended recipient of the message is determined by checking the address included with the message. Switch and bus interface 74 then routes the message to the appropriate location (host computer 72, communication bus 76, or wireless transceiver 80).

For example, if host computer 72 wishes to communicate with one of field devices 90, host computer 72 generates a message including the unique address for field device 90. The message is received by switch and host interface 74, which determines whether the message is intended for communication bus 78 or communication bus 88 by comparing the message address with the addresses of field devices 78 and field devices 90. Since the message is intended for one of field devices 90 on communication bus 88, switch and host interface 74 routes the message to wireless transceiver 80. Wireless transceiver 84 receives the message and passes it to bus interface 86. Bus interface 86 communicates the message onto communication bus 88 where the message is received by the appropriate field device 90. In this way, the message from host computer 72, intended for one of field devices 90, is not communicated across communication bus 78.

Therefore, it should be understood that this embodiment of the present invention enables all devices (including host computer 72, field devices 78, and field devices 90) to communicate with any other computer or device (or groups of computer or devices) on the system as if each computer or device were connected directly to a single communication bus.

As previously discussed, the distributed process control system of the present invention provides many benefits and capabilities that were previously unavailable, or overly complex and expensive. The wireless communication capabilities enable existing process control networks to be adapted and new process control and monitoring networks to be constructed, changed, and extended as needed and without expensive rewiring, costly homerun cabling, or complex and expensive customization of the local application. Furthermore, wireless communication need not be used entirely for remote applications located some distance away from a local application. Benefits are also achieved by using the present invention in nearby process control applications by providing wireless communication capabilities.

Although the present invention has been described with reference to preferred embodiments, workers skilled in the art will recognize that changes may be made in form and detail without departing from the spirit and scope of the invention. It should be recognized that the various embodiments presented above are not mutually exclusive. Rather, various portions of one embodiment could easily be combined with portions of another embodiment to achieve desirable results. In addition, actual implementations of the present invention need not be limited by the structure presented. For example, the present invention is capable of operating with any number of communication buses, and is not limited to only one or two. In addition, field devices could be added directly to any of the interfaces described, and not be connected directly to any wired communication bus.

The invention claimed is:

1. A distributed control and/or monitoring system comprising:
   a host computer;
   a host interface connected to the host computer, wherein the host computer and host interface are powered by a first power source;
   a communication bus;
   a plurality of field devices connected to the communication bus and communicating over the communication bus with packet messages according to a field device communication protocol; and
   a wireless bus interface connected to the communication bus for receiving the packet messages from the field devices, and wirelessly transmitting the packet messages to the host interface, and for wirelessly receiving the packet messages according to the field device communication protocol from the host interface and transmitting the packet messages over the communication bus to the field devices, the wireless bus interface providing central scheduling for communication on the communication bus, wherein the plurality of field devices, communication bus, and wireless bus interface are powered by a second power source different than the first power source.

2. The distributed system of claim 1, the host interface component of the wireless bus interface further comprising:
   interface electronics for communicating with the host computer; and
   a wireless transceiver for wirelessly sending data from the interface electronics and for receiving wireless data from the wireless bus interface.

3. The distributed system of claim 1, the host interface further comprising:
   a universal serial bus plug configured to connect with the host computer;
   universal serial bus electronics for communicating with the host computer through the universal serial bus plug; and
   a wireless transceiver for wirelessly communicating with the wireless bus interface.

4. The distributed system of claim 1, the wireless bus interface further comprising:

a wireless transceiver for wirelessly communicating between the wireless bus interface and the wireless host interface; and bus interface electronics for sending and receiving packet messages between the communication bus and the wireless transceiver.

5. A distributed control and/or monitoring system comprising:

a local application including a host computer, host interface, and a first plurality of field devices connected to a first communication bus for communicating packet messages according to a field device communication protocol, wherein the local application is powered by a first power source; and a remote application, separated from the local application, including a second plurality of field devices connected to a second communication bus for communicating packet messages according to the field device communication protocol, wherein the remote application is powered by a second power source different than the first power source; and means for wirelessly communicating a packet message between the local application communicating via the first communication bus and the remote application communicating via the second communication bus according to a wireless communication protocol, such that both the local application and the remote application communicate using the field device communication protocol without knowledge of the wireless communicating means interposed between the first communication bus and the second communication bus;

wherein the host interface provides central scheduling for communication between field devices on both the first communication bus and the second communication bus.

6. The distributed system of claim 5, wherein the means for wirelessly communicating comprises:

a host interface connected to the host computer to wirelessly transmit the packet messages from the host computer, and to wirelessly receive packet messages.

7. The distributed system of claim 5, wherein the means for wirelessly communicating comprises a wireless transceiver.

8. The distributed system of claim 5, wherein the means for wirelessly communicating comprises:

a wireless bus interface connected to the second communication bus to wirelessly transmit the packet messages from the second communication bus, and to wirelessly receive packet messages.

9. The distributed system of claim 5, the local application further comprising:

a second plurality of field devices connected to the first communication bus, wherein the second plurality of field devices communicate with the first plurality of field devices and the host computer as if each were connected to the same communication bus.

10. The distributed system of claim 9, wherein the means for wirelessly communicating comprises a wireless transceiver connected to the second communication bus.

11. The distributed system of claim 10, wherein the means for wirelessly communicating further comprises a wireless transceiver connected to the first communication bus.

12. A distributed control and/or monitoring system comprising:

a local application including a host computer and host interface connected to a first communication bus for communicating packet messages according to a field device communication protocol, wherein the local application is powered by a first power source;

a remote application separated from the local application and including a plurality of field devices and a second communication bus, wherein the remote application is powered by a second power source different than the first power source; and means for wirelessly communicating a packet message between the local application and the remote application as if they were connected to the same communication bus, wherein the interface provides central scheduling for communication between the host computer and the field devices connected to the first communication bus and the second communication bus.

* * * * *